US008359532B2

(12) United States Patent
Chen et al.

(10) Patent No.: US 8,359,532 B2
(45) Date of Patent: Jan. 22, 2013

(54) TEXT TYPE-AHEAD

(75) Inventors: Yen-Fu Chen, Austin, TX (US); Fabian F. Morgan, Austin, TX (US); Brian M. O'Connell, Cary, NC (US); Keith R. Walker, Austin, TX (US); Sarah V. White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1282 days.

(21) Appl. No.: 12/111,191

(22) Filed: Apr. 28, 2008

(65) Prior Publication Data

US 2009/0271700 A1    Oct. 29, 2009

(51) Int. Cl.
    *G06F 17/20*      (2006.01)

(52) U.S. Cl. ......... 715/259; 715/255; 715/256; 715/271

(58) Field of Classification Search ................... 715/200, 715/221, 223, 224, 226, 255, 259, 256, 261, 715/271
See application file for complete search history.

(56) References Cited

U.S. PATENT DOCUMENTS

| | | | |
|---|---|---|---|
| 4,464,730 A * | 8/1984 | Lawrence et al. ............. | 715/210 |
| 5,251,131 A | 10/1993 | Masand et al. | |
| 5,623,406 A | 4/1997 | Ichbiah | |
| 5,752,051 A | 5/1998 | Cohen | |
| 5,772,585 A * | 6/1998 | Lavin et al. ................... | 600/300 |
| 5,896,321 A | 4/1999 | Miller et al. | |
| 6,055,542 A | 4/2000 | Nielsen et al. | |
| 6,131,092 A | 10/2000 | Masand | |
| 6,208,339 B1 | 3/2001 | Atlas et al. | |
| 6,377,965 B1 | 4/2002 | Hachamovitch et al. | |
| 6,564,213 B1 | 5/2003 | Ortega et al. | |
| 6,631,373 B1 * | 10/2003 | Otani et al. .......................... | 1/1 |

(Continued)

FOREIGN PATENT DOCUMENTS

| | | |
|---|---|---|
| EP | 1-109-115 A1 | 12/1999 |
| WO | 2004/010323 A2 | 1/2004 |

(Continued)

OTHER PUBLICATIONS

PCT Written Opinion and International Search Report, from the International Searching Authority, International Application No. PCT/EP2009/050252, Aug. 8, 2009.

(Continued)

*Primary Examiner* — Stephen Hong
*Assistant Examiner* — Gregory J Vaughn
(74) *Attorney, Agent, or Firm* — Schmeiser, Olsen & Watts; Mark Vallone (57) ABSTRACT

Methods and arrangements of text entry are discussed. Embodiments include transformations, code, state machines or other logic to index segments of text from multiple sources and receive segments of text being entered into text-entry applications in a floating application. The embodiments may also involve matching the segments of text to indexed segments of text and entering completions of the received segments of text into the text-entry applications. The completions may be based upon the matching, and the completion of a segment may be entered into the text-entry application from which it was received.

17 Claims, 4 Drawing Sheets

U.S. PATENT DOCUMENTS

| | | | |
|---|---|---|---|
| 6,678,694 B1 | 1/2004 | Zimmermann et al. | |
| 6,816,578 B1 | 11/2004 | Kredo et al. | |
| 6,879,691 B1 | 4/2005 | Koretz | |
| 7,003,446 B2 | 2/2006 | Trower et al. | |
| 7,027,192 B2 | 4/2006 | Kawai | |
| 7,113,803 B2 | 9/2006 | Dehlin | |
| RE39,326 E | 10/2006 | Comer et al. | |
| 7,146,571 B2 | 12/2006 | Bates et al. | |
| 7,149,970 B1 | 12/2006 | Pratley et al. | |
| 7,181,497 B1 | 2/2007 | Appelman et al. | |
| 7,185,271 B2 | 2/2007 | Lee et al. | |
| 7,293,231 B1 | 11/2007 | Gunn et al. | |
| 7,529,731 B2 | 5/2009 | Bier | |
| 7,558,778 B2 | 7/2009 | Carus et al. | |
| 7,558,792 B2 | 7/2009 | Bier | |
| 7,650,348 B2 | 1/2010 | Lowles et al. | |
| 7,661,064 B2 | 2/2010 | Cicerone | |
| 7,679,534 B2 | 3/2010 | Kay et al. | |
| 7,698,127 B2 | 4/2010 | Trower et al. | |
| 7,702,731 B2 | 4/2010 | Lingafelt et al. | |
| 7,895,032 B2 | 2/2011 | Mullen | |
| 2002/0013705 A1 | 1/2002 | Jaepel et al. | |
| 2003/0033287 A1* | 2/2003 | Shanahan et al. | 707/3 |
| 2003/0033288 A1* | 2/2003 | Shanahan et al. | 707/3 |
| 2003/0061200 A1* | 3/2003 | Hubert et al. | 707/3 |
| 2003/0061201 A1* | 3/2003 | Grefenstette et al. | 707/3 |
| 2003/0171910 A1 | 9/2003 | Abir | |
| 2004/0039988 A1 | 2/2004 | Lee et al. | |
| 2005/0086596 A1 | 4/2005 | Koch et al. | |
| 2005/0108630 A1 | 5/2005 | Wasson et al. | |
| 2005/0132297 A1 | 6/2005 | Milic-Frayling et al. | |
| 2005/0155017 A1 | 7/2005 | Berstis et al. | |
| 2005/0188330 A1 | 8/2005 | Griffin | |
| 2005/0289103 A1 | 12/2005 | Bier | |
| 2005/0289141 A1 | 12/2005 | Baluja | |
| 2006/0074980 A1* | 4/2006 | Sarkar | 707/104.1 |
| 2006/0080303 A1 | 4/2006 | Sargent et al. | |
| 2006/0090154 A1* | 4/2006 | Bustelo et al. | 717/110 |
| 2006/0106769 A1 | 5/2006 | Gibbs | |
| 2006/0165289 A1 | 7/2006 | Boss et al. | |
| 2006/0247915 A1 | 11/2006 | Bradford et al. | |
| 2007/0033217 A1 | 2/2007 | Basner | |
| 2007/0033275 A1 | 2/2007 | Toivonen et al. | |
| 2007/0050352 A1 | 3/2007 | Kim | |
| 2007/0076862 A1 | 4/2007 | Chatterjee et al. | |
| 2007/0100890 A1 | 5/2007 | Kim | |
| 2007/0133507 A1 | 6/2007 | Da Palma et al. | |
| 2007/0208998 A1 | 9/2007 | Cicerone | |
| 2007/0250504 A1 | 10/2007 | Chen et al. | |
| 2007/0250765 A1 | 10/2007 | Chen et al. | |
| 2007/0296615 A1 | 12/2007 | Raguseo | |
| 2008/0010274 A1 | 1/2008 | Carus et al. | |
| 2008/0021924 A1 | 1/2008 | Hall et al. | |
| 2008/0065617 A1 | 3/2008 | Burke et al. | |
| 2008/0071708 A1 | 3/2008 | Dara et al. | |
| 2008/0155464 A1* | 6/2008 | Jones et al. | 715/787 |
| 2008/0243841 A1 | 10/2008 | Bonnet et al. | |
| 2008/0263032 A1 | 10/2008 | Vailaya et al. | |
| 2008/0263033 A1 | 10/2008 | Vailaya et al. | |
| 2008/0270351 A1* | 10/2008 | Thomsen | 707/2 |
| 2008/0270382 A1* | 10/2008 | Thomsen et al. | 707/5 |
| 2008/0270451 A1* | 10/2008 | Thomsen et al. | 707/102 |
| 2008/0320411 A1 | 12/2008 | Chen et al. | |
| 2009/0132234 A1* | 5/2009 | Weikel | 704/3 |
| 2009/0182741 A1 | 7/2009 | Chen et al. | |
| 2009/0271700 A1 | 10/2009 | Chen et al. | |
| 2010/0010989 A1 | 1/2010 | Li et al. | |

FOREIGN PATENT DOCUMENTS

| | | | |
|---|---|---|---|
| WO | 2006/055120 A2 | 5/2006 | |

OTHER PUBLICATIONS

Trnka, Yarrington, et al., "The Effects of Word Prediction on Communication Rate for AAC", NAACL-HLT, Rochester, NY, Apr. 2007, pp. 1-2.

"Using Sure Type?", http://www.blackberry.com/solutions/pdfs/suetypeblackberry7100v.pdf; 2005 Research in Motion Limited, pp. 2.

Dowman, Mike et al., "Web-Assisted Annotation, Semantic Indexing and Search of Television and Radio News", WWW 2005, Chiba, Japan, May 10-14, 2005 pp. 225-233.

Capra III, Robert G., et al., "Using Web Search Engines to Find and Refind Information", IEEE Computer, Oct. 2005, pp. 36-42.

Vehvilainen, Antti, et al., "A Semi-Automatic Semantic Annotation and Authoring Tool for a Library Help Desk Service", Proc. of the 1st Semantic Authoring and Annotation Workshop (ISWC-2006), Copyright 2006, pp. 1-9.

Turney, Peter D., "Coherent Keyphrase Extraction via Web Mining", Proc. oOf IJCAI, Copyright, 2004, pp. 434-439.

Bast, Holger, et al., "Type Less, Find More: Fast Autocompletion search with a Succinct Index", SIGIR '06, Seattle WA, Aug. 6-11, 2006, pp. 364-371.

Wusteman, Judith, et al., "Using Ajax to Empower Dynamic Searching", Information Technology and Libraries, vol. 25, No. 2, Jun. 2006, pp. 1-16.

Bangalore, Anantha, et al., "UMLSKS Suggest: An Auto-complete Feature for the UMLSKS Interface Using AJAX", AMIA 2006 Symposium Proceedings, Copyright 2006, p. 851.

Hyvonen, Eero, et al., "Semantic Autocompletion", ASWC 200, LNCS 4185, Springer-Verlag, Berlin, Germany, Copyright, 2006, pp. 739-751.

Lin, Shian-Hua, et al., "Discovering Informative Content Blocks from Web Documents", SIGKDD '02, Edmonton, Alberta, Canada, Jul. 23-26, 2002, pp. 588-593.

Kellar, Melanie, et al., "Using Web Browser Interactions to Predict Task", WWW 2006, Edinburgh, Scotland, May 23-26, 2006, pp. 843-844.

"n-gram", Wikipedia, downloaded from: en.wikipedia.org/wiki/N-gram on Apr. 23, 2010, pp. 1-5.

Non-Final Office Action dated Apr. 27, 2010 for U.S. Appl. No. 12/015,361.

Final Office Action dated Oct. 13, 2010 for U.S. Appl. No. 12/015,361.

Non-Final Office Action dated May 7, 2010 for U.S. Appl. No. 11/766,193.

Final Office Action dated Oct. 20, 2010 for U.S. Appl. No. 11/766,193.

PCT Written Opinion and International Search Report, from the International Searching Authority, International Application No. PCT/EP2008/057537, Nov. 25, 2008.

U.S. Appl. No. 11/766,193, filed Jun. 21, 2007.

U.S. Appl. No. 12/015,361, filed Jan. 16, 2008.

Request for Continued Examination for U.S. Appl. No. 12/015,361, filed Mar. 14, 2011.

Request for Continued Examination for U.S. Appl. No. 11/766,193; filed Mar. 21, 2011.

Office Action (Mail Date Jun. 5, 2012) for U.S. Appl. No. 11/766,193, filed Jun. 21, 2007.

Notice of Allowance (Mail Date Jul. 13, 2012) for U.S. Appl. No. 12/015,361, filed Jan. 16, 2008.

U.S. Appl. No. 13/603,884. filed Sep. 5, 2012; First Named Inventor: Yen-Fu Chen.

* cited by examiner

TEXT TYPE-AHEAD

BACKGROUND OF THE INVENTION

The present invention is in the field of text entry. More particularly, the present invention relates to methods and arrangements to auto-complete user-entered text.

Users of applications that accept text entry, such as Instant Message (IM) clients and email programs, often type keywords or phrases that they have previously typed or previously seen in a text document. For example, an IM user may use some words or phrases regularly. Examples include information about the user's availability such as, "Sorry, on a call right now. Will ping you later"; "long" keywords or phrases, such as "polymorphism" or "IBM Tivoli Composite Application Manager (ITCAM)"; or a referral for a certain expertise. For instance, an IM user may type a message to another contact saying: "For the ABC problem in product XYZ, you can contact Joe Somebody, as he is the developer of that component. His short name is joesomebody@us.ibm.com". Similarly, a user may email or IM friends about a recently viewed web page.

In current applications that accept text entry, entering text that a user has previously typed or viewed may require manually performing a laborious and time-consuming series of steps. Below is an example of the manual method, in a scenario in which a user repeatedly asks permission to use a resource:

[Danny→Brent]:
    Danny: "Are you using the CCT Dev machine? It won't accept my connection because someone else is logged on."
    Brent: "No. Try checking with Dave."
[Danny→Dave]
    Danny: "Are you using the CCT Dev machine? It won't accept my connection because someone else is logged on."
    Dave: "No. Try checking with Sherry and Eileen."
[Danny→Sherry/Eileen]
    Danny: "Are you using the CCT Dev machine? It won't accept my connection because someone else is logged on."

In this scenario, Danny continues to ask the same question and provide the same explanation to other IM users. To avoid retyping, Danny may perform the typical steps of copying and pasting. These steps include:
1. Locate the previous text. Right click on the Contact name>Choose Show>Chat History. To execute this step, Danny must know the person he was chatting with and the location of the text within the chat.
2. Search for the chat history text.
3. Highlight the text.
4. Hit Ctrl-C to copy.
5. Go to the new chat window.
6. Paste the text.
7. Modify the text as necessary.
8. Hit ENTER to send message.

The above example described entering text a user had previously typed. The process of entering text from a text document that the user had recently viewed is similar. In particular, to use a phrase in a blog or web article requires locating the web page. In either case, the steps are time consuming and require knowledge of the source of the text to be reused.

BRIEF SUMMARY OF THE INVENTION

The problems identified above are in large part addressed by methods and arrangements of text entry. One embodiment provides a method of text entry. The method may involve indexing segments of text from multiple sources and receiving segments of text being entered into text-entry applications in a floating application. The method may also involve matching the segments of text to indexed segments of text and entering completions of the received segments of text into the text-entry applications. The completions may be based upon the matching, and the completion of a segment may be entered into the text-entry application from which it was received.

In several embodiments, the method may involve finding several matches to a segment, displaying the matches to a user, and receiving from a user a selection of a match. The method may also involve entering a completion of the segment based upon the selected match. The method may include ordering the matches by a characteristic, such as the author or location.

BRIEF DESCRIPTION OF THE SEVERAL VIEWS OF THE DRAWINGS

Advantages of the invention will become apparent upon reading the following detailed description and upon reference to the accompanying drawings in which like references may indicate similar elements.

DETAILED DESCRIPTION OF THE INVENTION

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements of text entry are contemplated. Embodiments include transformations, code, state machines or other logic to index segments of text from multiple sources and receive segments of text being entered into text-entry applications in a floating application. The embodiments may also involve matching the segments of text to indexed segments of text and entering completions of the received segments of text into the text-entry applications. The completions may be based upon the matching, and the completion of a segment may be entered into the text-entry application from which it was received.

In several embodiments, the method may involve finding several matches to a segment, displaying the matches to a user, and receiving from a user a selection of a match. The embodiments may also involve entering a completion of the segment based upon the selected match. The embodiments may include ordering the matches by a characteristic, such as the author or location.

While specific embodiments will be described below with reference to particular circuit or logic configurations, those of skill in the art will realize that embodiments of the present invention may advantageously be implemented with other substantially equivalent configurations.

Figure 1:
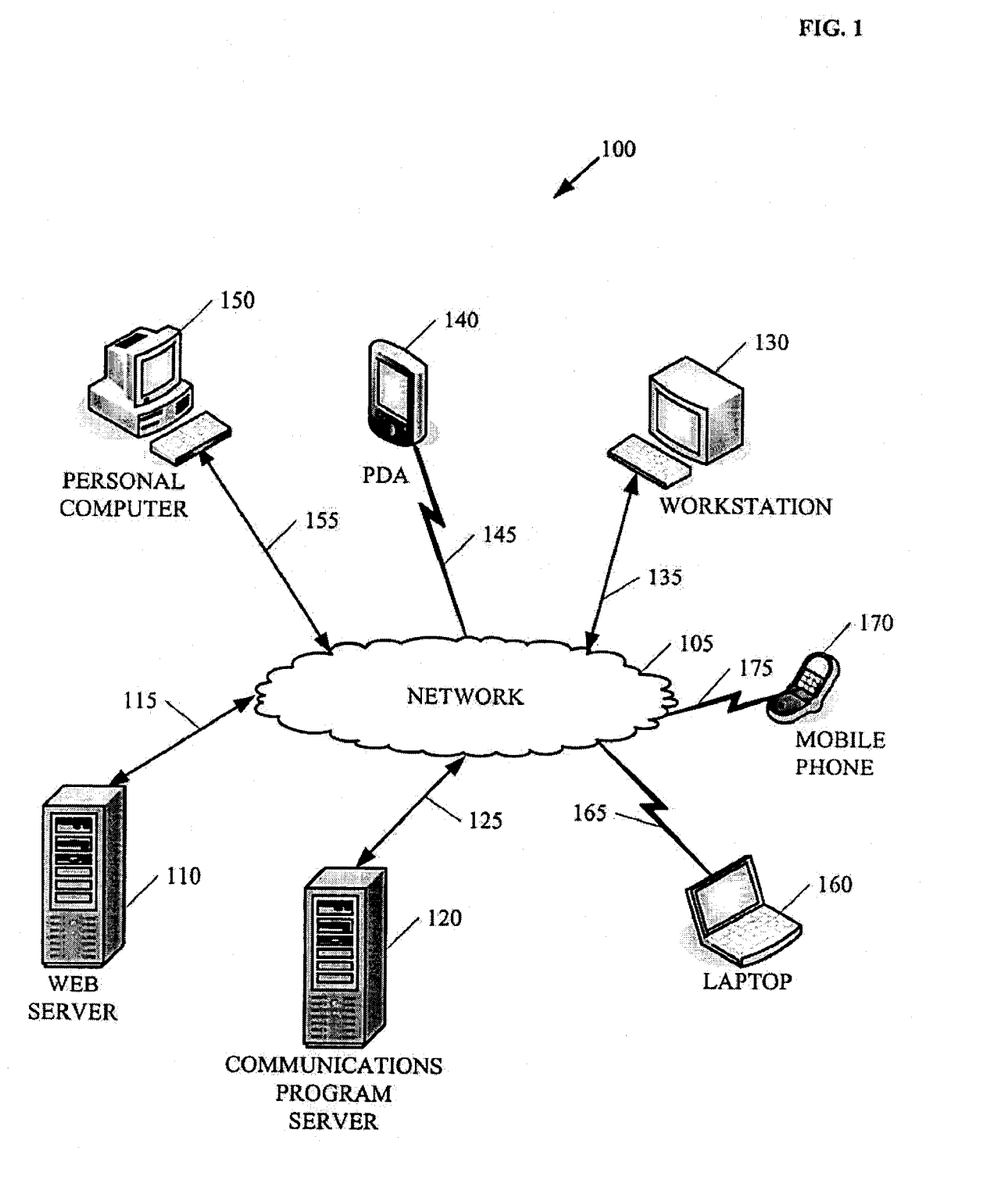
FIG. 1 is a network diagram of an embodiment of devices to enter text into applications.

FIG. 1 depicts a diagram of an embodiment of a networked system 100 of devices capable of entering text into applications. The system 100 includes a network 105, web server 110 connected to network 105 through wireline connections 115, communications program server 120 connected to network 105 through wireline connection 125, and a variety of devices capable of entering text into applications (text entry devices), including:

- workstation 130, a computer coupled to network 105 through wireline connection 135,
- personal digital assistant 140, coupled to network 105 through wireless connection 145,
- personal computer 150, coupled to network 105 through wireline connection 155,
- laptop computer 160, coupled to network 105 through wireless connection 165; and
- mobile phone 170, coupled to network 105 through wireless connection 175.

The text entry devices 130, 140, 150, 160, and 170 may select segments of text from objects containing text (text objects). Text objects may include text files or retrievable text such as through a query to a local or remote database, an application programming interface (API) call to an application, or other text accessible through some sort of interface. A segment may consist of a word, a phrase, a sentence, a paragraph, or other unit of text. A phrase may consist of a string of words terminated by particular punctuation marks, such as ",'' ";" "." or "?" or by line return. A word may consist of a string of alpha-numeric characters terminated by whitespace or by particular punctuation marks. The text objects may include documents authored by a user of the devices, such as email messages and IM; and may include documents created by others, such as web pages, blog entries, pages of shopping sites, and web encyclopedias. In some embodiments, the selection may be based upon patterns of the text. The devices may also index the selected text, match text currently being entered by the user into an application to a portion of a segment of the indexed text, and enter a remaining portion of the segment of text into the application based upon the matching. The entering of a remaining portion of a segment in response to matching the portion is called text completion or text type-ahead.

Network 105, which may consist of the Internet or another wide area network, a local area network, or a combination of networks, may provide data communications among web server 110 and communications program server 120 and the devices 130, 140, 150, 160, and 170. Web server 110 may have installed and operative upon it software to manage a web site or sites. The software may include instructions to generate content and to communicate with visitors to the web site or web sites.

Communications program server 120 may enable users of the devices 130, 140, 150, 160, and 170 to communicate across network 105. In some embodiments, communications program server 120 may provide instant message service. Examples of instant message programs include Microsoft's Windows Messenger, IBM's Lotus Sametime, Yahoo!® Messenger, and AOL's AIM®. Typically, a person at one of the devices 130, 140, 150, 160, and 170 may initiate, an instant message chat session by invoking an instant message client program and identifying one or more additional people to participate in the chat session. The initiator may identify other desired participants in the chat session by accessing a directory and selecting individuals or groups of people listed in the directory. The client program may send to the communications program server 120 identifications, such as e-mail addresses, of the other desired participants.

In response, the communications program server 120 may attempt to connect to the client workstations or other computing devices of the other desired participants to determine if they are currently on-line. If communications program server 120 successfully connects with a desired participant, it may create a chat session for the desired participant by invoking the participant's chat session client program and identifying the active members of the chat session. In addition, the communications program server 120 may notify the initiator of the desired participants who are not currently available for a chat session.

Communications program server 120 may then establish communications between the participants. In some implementations of chat client programs, communication between clients is done on a peer to peer level; i.e. directly from a user device such as devices 130, 140, 150, 160, and 170 to another user device without mediation by or assistance from communications program server 120. In other implementations, a message from one participant may be relayed through communications program server 120. In either implementation, a message sent by one participant is sent to all of the other participants and may be displayed on their user devices nearly in real time.

In many embodiments, communications program server 120 may provide email service for users of the devices 130, 140, 150, 160, and 170. Communications program server 120 may contain instructions to receive email messages over network 105, to store the messages, and to upload the messages to the users when they sign in. Communications program server 120 may also contain instructions to receive email messages from the users and forward them on the way to their designated destinations. Examples of email programs include IBM® Lotus Notes®, Eudora®, Outlook®, and Outlook Express®.

The arrangement of web server 110 and communications program server 120 and other devices making up the exemplary system illustrated in FIG. 1 is for explanation, not for limitation. Data processing systems useful according to various embodiments of the present invention may omit a server, or may include additional servers, routers, other devices, and peer-to-peer architectures, not shown in FIG. 1, as will occur to those of skill in the art. Some embodiments may include additional servers to supply text to the text entry devices for indexing and matching. Examples include file servers and data base servers. Many embodiments may include a text entry server to index and match text. In these embodiments, a text-entry device may transmit a segment of text to the text-entry server. The text-entry server may match the segment against a library of indexed segments of text. In some embodiments, a device capable of text completion may not be connected to a network at all. In other embodiments, a text completion feature may select text only from text stored on the device.

In other embodiments, users may participate in an instant message chat session by establishing peer-to-peer connections or by visiting a web site. Multiple web servers may maintain a single web site or one web server may maintain multiple sites. Multiple servers may provide for email service. For example, a system for providing email may include a separate server or servers for receiving email, such as POP3 servers; and for sending email, such as SMTP servers. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
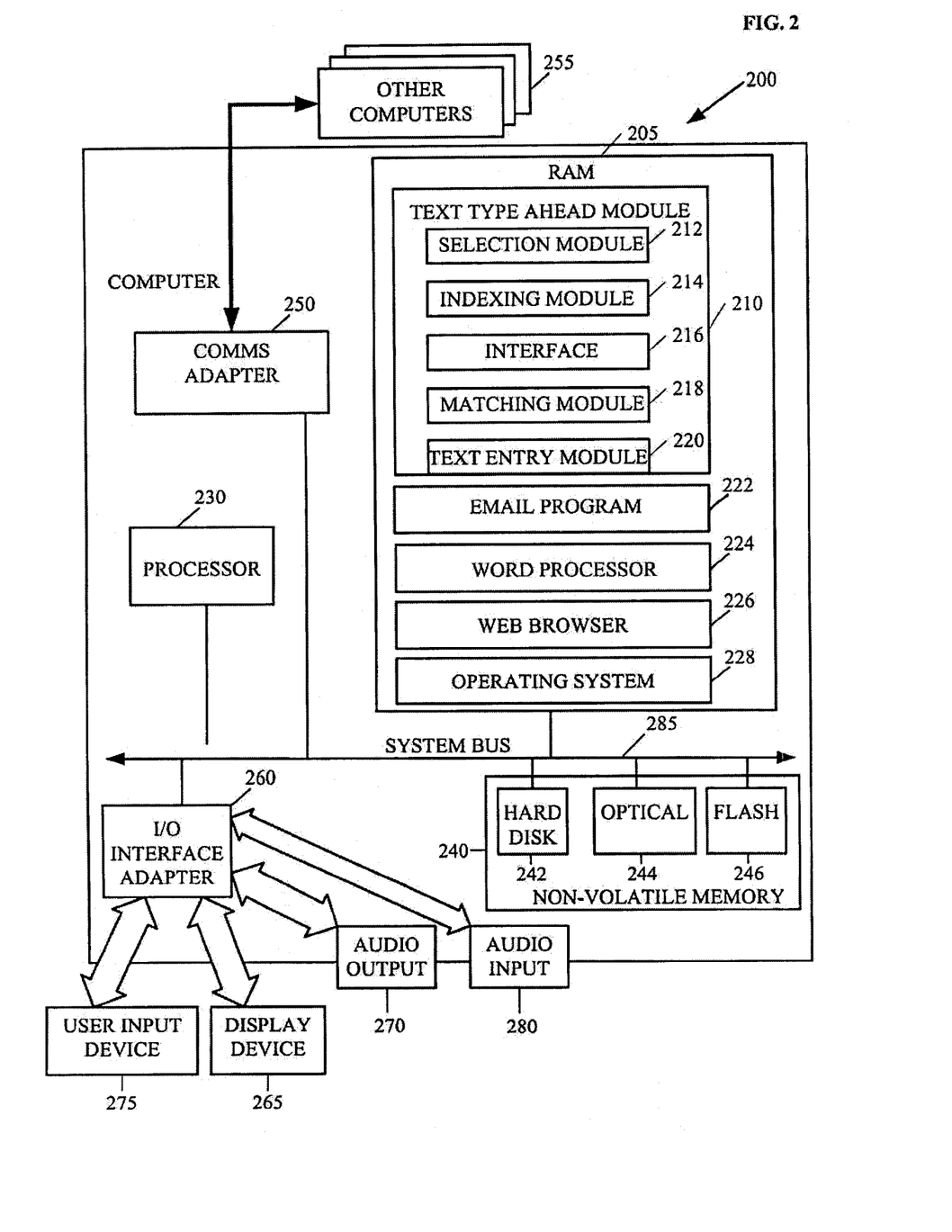
FIG. 2 depicts an embodiment of a computer capable of entering text into applications.

Turning to FIG. 2, depicted is an embodiment of a computer 200 capable of entering text into applications that includes random access memory (RAM) 205, a processor 230 or CPU, non-volatile memory 240, a communications adapter 250, and an Input/Output (I/O) interface adapter 260 connected by system bus 285. Stored in RAM 205 is text type-ahead module 210, email program 222, word processor 224, web browser 226, and operating system 228.

Text type-ahead module 210 may comprise computer program instructions for auto-completing user-entered text. Text type-ahead module 210 includes selection module 212, indexing module 214, interface 216, matching module 218, and text entry module 220. Selection module 212 may select segments of text from text objects. The text objects may include objects composed by a user of computer 200, such as email and IM messages and address books and other data files. The text objects may also include objects created by others, such as web pages, blog entries, pages of shopping sites, web encyclopedias, company organization charts and inventory lists.

In some embodiments, the selecting may be based upon patterns of text in the text objects. The patterns may be based upon the number of words in phrases of the text or upon the number of letters in words of the text. Indexing module 214 may index the selected text. Interface 216 may receive user-entered text from several applications, such as email, instant messenger, and word processing. Interface 216 may also display to a user possible completions of the user-entered text and may receive a selection of the desired completion from the user. Interface 216 may also receive from a user options for the configuration of text type-ahead module 210. Matching module 218 may match text currently being entered by the user into an application to a portion of a segment of the indexed text, and text entry module 220 may enter a remaining portion of the segment of indexed text into the application based upon the matching.

In the embodiment of FIG. 2, text type-ahead module 210 may constitute a separate program that may provide a type-ahead feature for multiple applications, including email program 222 and word processor 224. Text type-ahead module 210 may select segments of text from multiple sources, including text entered into email program 222 and word processor 224 and text viewed through the web browser 226. Text type-ahead module 210 may gather the selected text into a single repository, index the segments, match the segments against text entered into either of the programs 222 and 224, and enter text into the program. In further embodiments, plug-ins to the programs 222 and 224 may enable text type-ahead module 210 to access text entered into the programs and to auto-complete text entered into the programs. A plug-in is an auxiliary program that enhances the capability of another program. The other program may provide a standard interface for plug-ins.

In a few embodiments, text type-ahead module 210 may be based upon a service-oriented architecture (SOA). SOA may be a form of modular programming especially useful in business applications. Using SOA, applications that support business processes may be restructured into reusable building blocks or services. These services can be combined, configured, and reused for rapid modification. Other components of a SOA application, more technical in nature, provide operational capabilities such as database access, queue support, authentication and authorization, error handling, auditing and logging. Still other components, called engines, help integrate the other components. They may provide such functions as brokering, integration, business process management, mission critical messaging, and transformation capability. An SOA architectures for a text type-ahead module may divide the module into such components as data access, data base, keyword extraction, and interface with text-entry modules. The data access function may access sources of text for selection and indexing. The data base function may store and access indexed text. Keyword extraction may select text based upon patterns of the text.

Email program 222 may comprise computer program instruction for sending, receiving, and storing emails. Word processor 224 may comprise computer program instructions for creating and editing text. The computer program instructions may provide for generating windows and processing text that a user may enter into the windows. Operating system 228 may comprise UNIX™, Linux™, Microsoft Windows™, AIX™, of other operating systems useful for auto-completion programs as will occur to those of skill in the art.

The modules shown in RAM 205 are for explanation, not for limitation. In several embodiments, a text type-ahead module may auto-complete text entered into programs other than word-processing programs and email programs, such as web browsers, instant message programs, and translation programs. For example, a user may begin to enter text for translation into a program. The text type-ahead module may match the text to text previously entered and auto-complete the text entry. The completed entry may then be translated by the translation program.

Text type-ahead module 210, email program 222, word processor 224, web browser 226, and operating system 228 (components of software) are shown in RAM 205 in FIG. 2, but many components of such software may be stored in non-volatile memory 240 also. Further, while the components of such are shown simultaneously present in RAM, in some other embodiments, only some of the components of RAM 205 may be present at any given time.

Non-volatile computer memory 240 may be implemented as a hard disk drive 242, optical disk drive 244, electrically erasable programmable read-only memory space (EEPROM or Flash memory) 246, RAM drives (not shown), or as any other kind of computer memory as will occur to those of skill in the art. Communications adapter 250 may implement the hardware level of data communications through which one computer sends data communications to other computers, such as other computers 255, directly or through a network. The data communications may include transmitting and receiving instant messages and email messages. Such data communications may be carried out serially through RS-232 connections, through external buses such as USB, through data communications networks such as IP networks, and in other ways as will occur to those of skill in the art. Examples of communications adapters include modems for wired dial-up communications, Ethernet (IEEE 802.3) adapters for wired network communications, 802.11a/b/g/n adapters for wireless network communications, and mobile broadband cards.

I/O interface adapter 260 implements user-oriented I/O through, for example, software drivers and computer hardware for controlling output to display devices such as display device 265 and audio output device 270 as well as user input from user input device 275 and audio input device 280. User input device 275 may include both a keyboard and a mouse. Some embodiments may include other user input devices such as speech interpreters, bar code scanners, text scanners, tablets, touch screens, and/or other forms of user input devices. Audio output 270 may include speakers or headphones and audio input device 280 may include a microphone or other device to capture sound.

The computer and components illustrated in FIG. 2 are for explanation, not for limitation. In other embodiments, embedded systems, PDAs, cell phones, BlackBerries® and other devices which accept text entry may select text, index the selected text, match text currently being entered by the user into an application to the indexed text, and enter a phrase of text into the application based upon the matching. In other embodiments, modules to auto-complete text may be implemented in hardware, firmware, or in state machines or may form a component of an operating system. In several embodiments, a computing device may contain two or more processors. In various embodiments, a computing device may use point-to-point interconnects to connect processors or to connect a processor and another element of the computing system.

Figure 3:
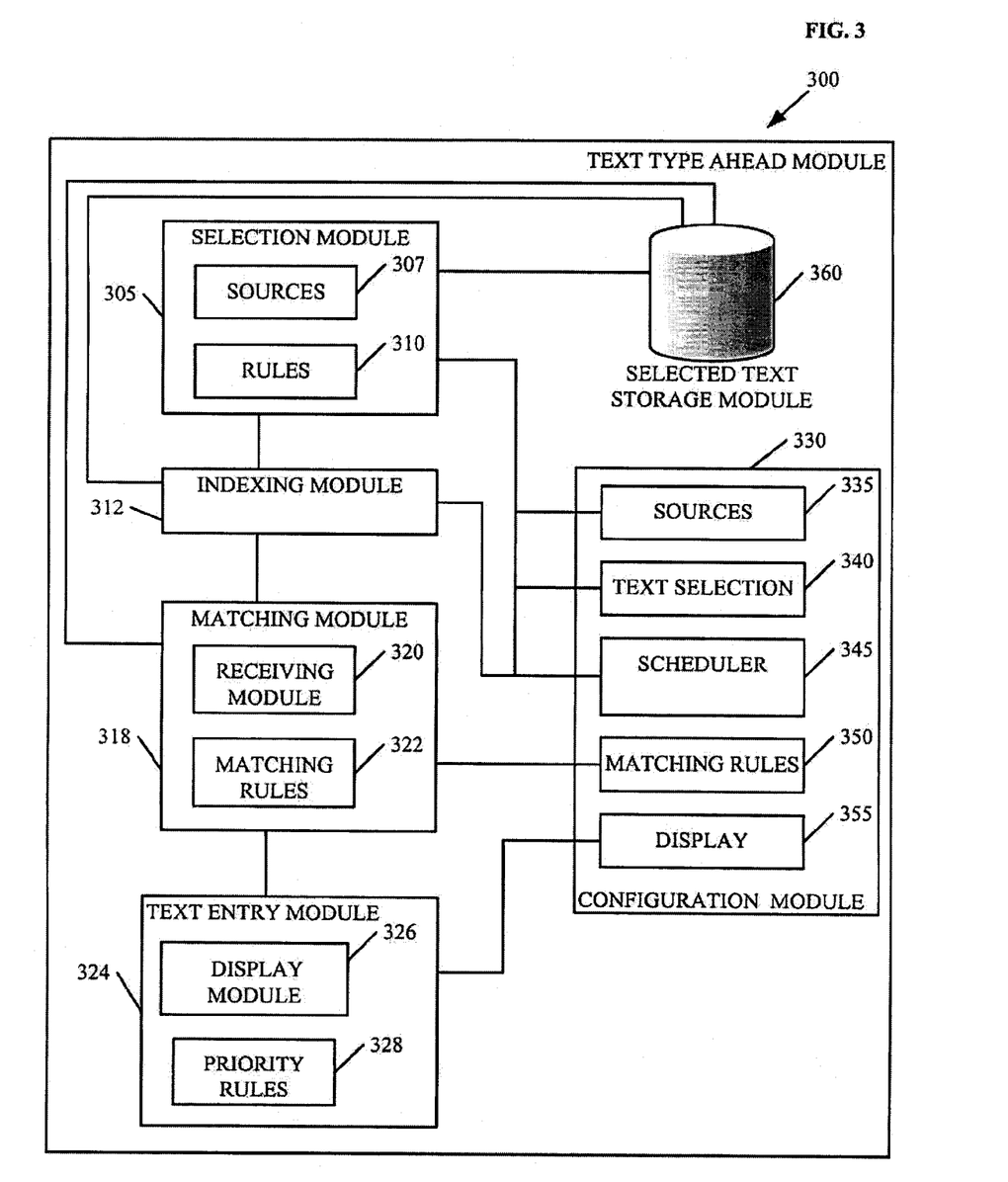
FIG. 3 depicts an embodiment of a text entry apparatus.

FIG. 3 illustrates an embodiment of a text type ahead module 300 that includes a selection module 305, an indexing module 312, a matching module 318, a text entry module 324, a configuration module 330, and a selected text storage module 360. Type-ahead module 300 may select segments of text and index the selected segments of text. Type-ahead module 300 may complete text entered by a user into several applications. For each of the applications, type-ahead module 300 may match text currently being entered by the user into the application to a portion of a segment of the indexed text and enter a remaining portion of the segment of text into the application based upon the matching.

Selection module 305 may select text from text objects. In some embodiments, the selection may be based upon patterns of the text. The text objects may include objects authored by a user of text type ahead module 300. In many embodiments, the text objects may include messages such as email messages and IM, Word documents, and data files such as address books. Many of these objects may be located on the user's local computer. In several embodiments, selection module 305 may select text from objects as the user is composing the objects. These objects may include text from chat windows or word processing documents that have not been saved. Selection module 305 may, for example, leverage memory buffers available in Microsoft Word to process the latest copy of text. In numerous embodiments, selection module 305 may select text stored in non-volatile memory or other long-term memory.

In some embodiments, selection module 305 may also select text from text objects created by others. These text objects may include data files such as address books, organizational charts, inventory lists, and files maintained by other programs which track data, such as programs providing the time of day. In many embodiments, selection module 305 may select text from remote objects, objects accessible over a network such as network 105 in FIG. 1. The remote objects may include text objects available from web sites, data base files, files available through a file server, and other objects. Web text objects may include news sites, blog entries, pages from shopping sites, web encyclopedias, and other web sites. News sites may include sites affiliated with a television network and sites that collect news articles (news aggregators). The news aggregators may provide an index of the collected articles or may provide a feed of the entire articles.

In many embodiments, selection module 305 may access remote text objects by sending a request to an application controlling access to the remote text objects. The request may be sent through a variety of methods. In some further embodiments, selection module 305 may request text from remote files through an external application programming interface (API) provided by a server for the files. The API may implement commands for extracting text from the web site. In many embodiments, a web service may provide access to text from remote files. Web services present a standardized way of integrating web-based applications. Web services typically provide business services upon request through data communications in standardized formats called bindings. A binding is a specification of a data encoding method and a data communications protocol. The most common binding in use for web services is data encoding in XML according to the SOAP protocol and data communications with HTTP. SOAP (Simple Object Access Protocol) is a request/response messaging protocol that supports passing structured and typed data using XML and extensions. In a few embodiments, selection module 305 may access text from a web site by visiting the site to obtain the HTML making up web pages and extracting text from the HTML. Selection module 305 may issue HTML requests for text from the web site. In several embodiments, selection module 305 may receive text from a web site through a plug-in to a web browser. In other embodiments, selection module 305 may access remote text files through other methods of communications as may occur to those of skill in the art.

Selection module 305 includes sources 307 and rules 310. In the embodiment of FIG. 3, a user may specify sources of text from which selection module 305 makes selections. Information about these sources may be stored in sources module 307. In some further embodiments, a user of text type ahead module 300 may specify objects authored by the user, such as email and IM messages, and address books and other data files. The user may also specify objects created by others, such as news sites, blog entries, pages from shopping sites, web encyclopedias, company organization charts and inventory lists. In many further embodiments, a user may specify a cut-off date for text selection. For example, in response to a user specification, selection module 305 may disregard text created in IM chat conferences or on websites more than two months earlier. In several further embodiments, the user may specify directories of files from which to select text created in word-processing programs.

In the embodiment of FIG. 3, rules module 310 may apply the rules or patterns used by selection module 305 to select segments of text. In some embodiments, the rules may apply to the content of the text. In many embodiments, the rules may apply to other characteristics of the text, such as the author or recipient. In several embodiments, the rules or patterns may be based upon the number of words in segments of the text or upon the number of letters in words of the text. Example rules or patterns of segments of text include phrases of four or more words, phrases containing at least two words of five or more characters, or words of ten or more characters. In some embodiments, the rules or patterns may be based upon other factors. For example, a pattern of text may consist of text that has been entered at least twice into an application whose text is a source for selection module 305.

In the embodiment of FIG. 3, selection module 305, operates as a rule-based pattern matcher, selecting text based upon the rules of rules module 310. In some embodiments, the rules may be represented declaratively, with rules module 310 containing a representation of a set of the rules as data. Selection module 305 may apply the rules to text by processing the data. In other embodiments, rules module 310 may consist of a program into which the rules were hard-coded. Execution of the program with text as data may apply the rules to the text.

Indexing module 312 may index segments of text selected by selection module 305. In some embodiments, the index of a segment of text may consist of the text to which the segment may be matched in accordance with matching rules 320, which may define a match between current text and indexed text. Typically, the current text and indexed text match when the current text is a beginning portion of the indexed text. For example, the currently entered text, "Are you on CC" may match the previously entered text "Are you on CCT Dev? It won't accept my connection because someone else is logged on." In the above example, the current text is exactly the same as a beginning portion of the previously entered text. In this case, the index of a segment of text may consist of an initial portion of the segment of text.

In other embodiments, the beginning portion and the current text need not be identical for the phrases to match. For example, whitespace and other non-alpha-numeric characters may be disregarded. "Hi there" may match "Hi, there." In this example, the indexing may delete non-alpha-numeric characters and may standardize whitespace. Similarly, the rules of matching rules 320 may disregard case. For example, in some embodiments, "Are you on CC" may match "are you on cct dev?" In these embodiments, the indexing may use only lower-case characters or may group indexed text differing in case.

A few embodiments may allow matching to the middle of a phrase. For these embodiments, indexing module 312 may index a segment of text by multiple portions of the segment. Similarly, in embodiments which require matched words to contain the same characters, with the possible exception of case, an index to a segment may contain exact words from the segment. Oh the other hand, in embodiments in which a portion of a segment of selected text may match several segments of current text, the indexing to the segment may indicate the range of matches. For example, if the matching rules permit "transmits" to match both "transmit" and "transmitted," then "transmits" may be indexed as "transmit*", where "*" represents any alphanumeric characters. As another example, if the matching rules disregard pronouns and articles, then the index to a segment of text may consist of a beginning segment stripped of pronouns and articles. Under such matching rules, "away from office" may match "I'm away from the office." The former phrase may then be used to index the latter. With this indexing scheme, a matcher may strip pronouns and articles from the current text and check for the transformed text in the index. In several embodiments, the rules of matching rules 320 may disregard short words, such as words of three characters or fewer. In several embodiments, the rules of matching rules 320 may disregard common words, such as definite articles, prepositions, and other common words. In these embodiments, the indexing may remove these words. In many embodiments, a user may specify the rules contained in matching rules 320.

Text entry module 324 may enter text into a document being composed in an application. Matching module 318 may match text being entered by a user into the document (current text) to a position of a segment of indexed text. Text module 324 may then enter the remaining portion of the segment of indexed text into the document. When the portion of the segment of text matched to the current text is the beginning portion of the segment of the text, the entry of the remaining portion amounts to completion of the current text.

Text entry module 324 includes display module 326 and priority rules module 328. Display module 326 may display matching segments of text to a user through a user interface. A text display may include an entire segment of text that matches current text, the remaining portion of text, or something in between. For example, if the user has typed "Are you on CC", and that current text is matched "Are you on CCT Dev?" the display may consist of the entire matching text "Are you on CCT Dev?" the remaining portion "T Dev?" or "CCT Dev?" Display module 326 may display possible completions in a floating window. In many of these embodiments, auto-completion module 300 is a stand-alone application that provides auto-completion for multiple other applications. Display module 326 may display the possible completions in-line, in the same window or other display mechanism in which the user is entering text into the document. In some embodiments, the possible completions may consist of differing lengths of indexed text. For example, the user may enter "Are you on CC". Display module 326 may then display both "Are you on CCT Dev?" and Are you on CCT Dev? It won't accept my connection because someone else is logged on." as possible completions. An in-line display may consist of a scrollable window, drop-down menu bar, or other display mechanism known to those of skill in the art.

The user may select a matching segment of text for entry of the remaining portion into the application. Alternatively, the user may continue typing to further restrict the list of matching segments. In some embodiments, if there is only one possible match, text entry module 324 may automatically enter the text into the application without selection by the user.

Priority rules module 328 may contain rules for the order of display of possible matches. Priority rules module 328, together with selection module 305, indexing module 312, and matching module 318, may attempt to display first the remaining portions of segments of text most likely to be selected by a user. In some embodiments, priority rules module 328 may determine an attribute of text and may base the order of display of potential matches on values of the attribute. Attributes of text may include frequency of appearance in news indices or other sources, location, time period or currency, subject matter, source, and target or recipient. For example, in some embodiments, priority rules module 328 may rate the indexed segments of text by the number of times they appear in news indices. Segments that appear in more indices may be displayed before segments that appear in fewer indices. Priority rules may be used in combination and, where conflicting, may be determined according to a numeric weighting or relative priority.

In some embodiments, priority rules module 328 may determine a location of a segment of indexed text and may give priority to those segments which match a current location of the user's computing device. In some further embodiments, priority rules module 328 may assign to segments of text extracted from a regional article the region of origin of the article as their location. For example, news from a municipal web paper may be assigned the location of that municipality. The location of a user's computer may be determined from an IP mapping, and the location of a user's mobile device may be determined from techniques such as GPS, IP, and cellular tower triangulation.

In some embodiments, priority rules module 328 may base the priority of matching segments of indexed text on a time period. In further embodiments, the time period of text may measure how current the text is. For example, yesterday's news may be of a different time period than breaking news. In some further embodiments, priority rules module 328 may determine the time period of indexed text from its time of origin. Text from a web page may be dated according to its publication date. The time period of text currently being entered by a user into an application may be determined by an examination of the pattern of word usage of the user. The examination may determine whether the user usually selects words from yesterday's news—i.e., they are a newspaper reader—or the user usually selects words from the latest breaking news. In these further embodiments, priority rules module 328 may give priority to matching segments of indexed text of the same time period or currency as the words selected by the user.

In a few embodiments, priority rules module 328 may base the priority of matching segments of indexed text on the source of the text. In further embodiments, priority rules module 328 may determine a source of the words entered by a user and may give priority to matching segments from the same sources. For example, priority rules module 328 may rank terms from a particular website, or even a particular section of a website, higher than terms from other websites. In some further embodiments, priority rules module 328 may study the pattern of words entered by a user to determine the sources. For example, priority rules module 328 may determine that the user usually selects words that come from a particular news site or a section of the news site. In other further embodiments, a user may specify sources to receive preference. In many further embodiments, priority rules module 328 may assign as the source of text the program creating the text. For example, when a user enters text into an IM chat window, priority rules module 328 may first display selections from other IM chats with the other participant or participants. In some embodiments of type ahead modules used with IM programs, searching, indexing, and display may be executed in the following order:

existing memory/cache
latest IM chat history/window
opened/frequently used IM source repository (e.g. IBM Lotus Sametime and MSN IM are both in use).

In some further embodiments, selection module 305 may assign a source to text during the selection process. For example, when selection module 305 selects text from a website, it may tag the text with an identification of the website.

Priority rules module 328 may include a learning feature. In some embodiments, for example, priority rules module 328 may monitor a user's selections of matches to an item of current text. Priority rules module 328 may then display potential matches in order of frequency of selection, with the most often selected shown at the top of list, the next most often selected shown second, etc.

Configuration module 330 may configure the other modules of auto completion module 300. Configuration module 330 includes source module 335, text selection module 340, scheduler 345, matching rules module 350, and display module 355. Configuration module 330 may receive specifications from a user about parameters for the operation of the other submodules of auto-completion module 300 and may set the parameters. Source module 335 may receive specifications and set parameters about the source of text for indexing and matching, such as how to retrieve text from websites, blogs, news indices, specific directories of word-processing documents, expiration dates for selection and indexing, data bases and auxiliary programs that provide data that may be used in text entry. In some embodiments, text selection module 340 may receive specifications and set rules describing patterns of text to be indexed, such as phrases of at least four words or words of at least ten characters. In many embodiments, a user may specify other characteristics of text to be used for selection, such as content, author, or recipient. For example, a user may specify that selection of text from postings to a network technology blog should be limited to postings about a specific network protocol. Scheduler 345 may receive information about the scheduling of selection module 305 and indexing module 312 and may set their schedules. Typical schedules may be daily, every few days, or weekly. A schedule selection and indexing may, however, be postponed if current I/O usage is high. Matching rules module 350 may receive specifications of matching rules for matching module 318. Display module 355 may set parameters regarding the display of display module 326. The parameters may, for example, govern the order in which to show possible completions, whether to automatically enter the only possible completion, and the minimal number of characters to be entered before possible completions are shown.

Selected text storage module 360 may store segments of text selected by selection module 305 and indices created by indexing module 312. Selected text storage module 360 may be accessed by matching module 318 for segments of text that match current text. Matching module 318 may pass the matches on to text entry module 324 for display through display module 326 and entry in applications. In some embodiments, selected text storage module 360 may also store attributes of the segments of text, such as their source or their creation date.

FIG. 3 is for illustration and not limitation. Some embodiments of a type-ahead module may omit some of the feature shown and many embodiments may include additional features. For example, some type-ahead modules may omit a configuration module. Similarly, in other embodiments of a type-ahead module, the division of functionality between modules may differ from the division shown in FIG. 3. Functions of several modules may be combined in one module, or functions of one module may be split among several. In a few embodiments, selection of text for indexing may not be based upon pattern. All segments may be indexed. In other embodiments, the patterns for selection may be fixed, not subject to specification by a user.

Figure 4:
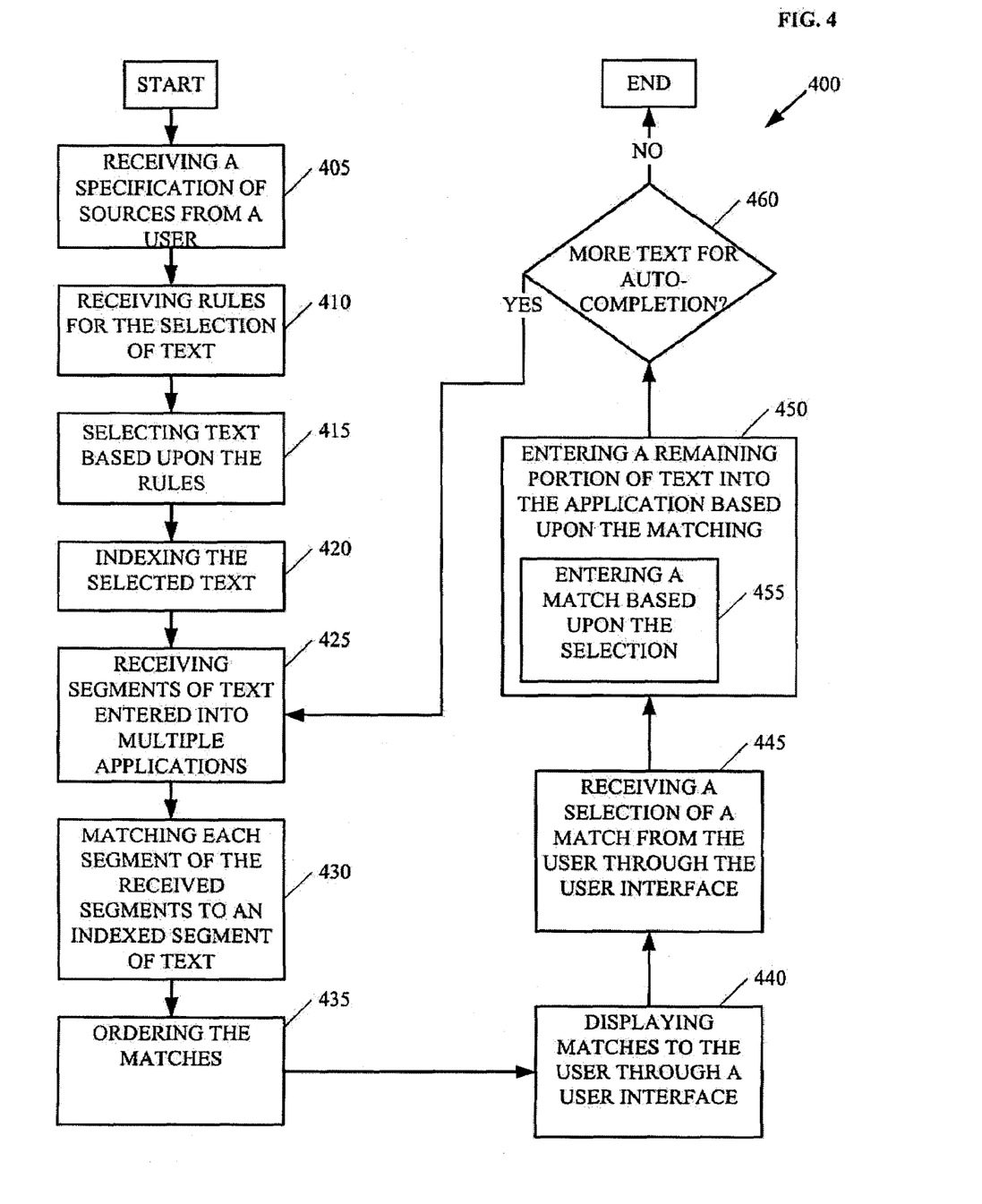
FIG. 4 is a flowchart of an embodiment of a method to enter text into applications.

FIG. 4 depicts a flowchart of an embodiment of a method to complete text. The method may be performed by an apparatus such as text type-ahead module 210 of FIG. 2. Flowchart 400 of FIG. 4 begins with receiving a specification of sources of text from a user (element 405). The sources may include text objects authored by a user of the devices. The text objects may include messages, such as email and IM messages; and may include data files, such as address books. The sources may also include objects created by others, such as news sites, blog entries, pages from shopping sites, web encyclopedias, company organization charts, and inventory lists. The sources may include local objects, remote objects, or both. In some embodiments, the specification of sources may include a cut-off date for using previously entered text for auto-completion; directories of word processing documents; or programs or data files with information the user may wish to reference, such as address books or organizational charts.

The method may include receiving rules for the selection of text (element 410), wherein the text is selected based on the rules (element 415). In some embodiments, the rules may be based upon the number of words in phrases or upon the number of letters in words. In many embodiments, the rules may also be based on other attributes of the text, such as subject, author, recipient, or frequency. For example, in some embodiments, text may be selected for use in auto-completion only if the text is found at least twice in the sources of text. A module such as type-ahead module 300 of FIG. 3 may apply the rules to select text from the specified sources. In some embodiments, the content of rules supplied by users may not provide the exclusive criteria for text selection. In some further embodiments, a type-ahead module may apply default rules in the absence of rules entered by a user. In many further embodiments, a type-ahead module may select text based upon built-in rules.

The method may include indexing the selected text (element 420). The indexing may be based upon the methods of matching used in element 430. For example, current text may match indexed text when the current text forms the beginning of the indexed text. In such cases, the indexed text may be indexed by the beginning phrase. In some embodiments, a word in current text may match a word in indexed text if the words have the same stem. In such cases, the index to the indexed text may contain the stem of the word.

The method may include receiving segments of text entered into multiple applications (element 425). A text type-ahead module may operate in connection with several text entry applications, such as a word-processing program, an email program, and several instant messenger programs. The text type-ahead module may consist of a floating application which generates a persistent, independent process. A persistent process may be always running, such as a daemon or software agent. Because of its independence, the text type-ahead module may require configuration only once, rather than once for each of the text-entry applications it works with.

To receive text from one of the text-entry applications, the text type-ahead module may be invoked and a user may enter text for completion by the module. For example, the user may invoke the module from a window of one of the text-entry applications. In some embodiments, the user may invoke the text type-ahead module from the application by typing a keystroke or a combination of keystrokes such as Ctrl-Space or Ctrl-Tab in the application. The user may then enter text to be completed by the text type-ahead module. In some further embodiments, the user may enter the text in-line, in the window of the application from which the module was invoked. In other further embodiments, the text type-ahead module may generate a separate window for text entry. In contrast, in some embodiments, the module may automatically attempt to complete text entered into a text-entry application, without specific invocation by a user.

The method may include attempting to match the segments received from the various applications to segments of indexed text (element 430). In some embodiments, the matching may consist of searching for indexed text with the same beginning as the current text. In many embodiments, the portion of indexed text may not be identical to the current text. For example, words with the same stem may match, or articles may be ignored in finding a match. In some embodiments, the method may include filtering the sources based upon a specification of sources from a user. The text type-ahead module may limit its search to indexed segments from sources specified by the user. For instance, the search for a match may be limited to segments from recent instant message conversations or to segments from a particular web site. Filtering may increase efficiency and speed. Without filtering, a text type-ahead module may search through all indexed text, from whatever source, to find matches. It may then eliminate the matches not from desired sources.

If the received segment is successfully matched to one or more indexed segments, the method may include ordering the matches (element 435). The ordering may attempt to place the most likely matches first. For example, a text type-ahead module may place first matching segments found in recent documents typed by the user, or may place first matching segments most frequently selected by the user for text completion.

The method may include displaying matches to the user through a user interface (element 440). In some embodiments, the display may be in-line, as part of the display of the application into which the user is entering text. In other embodiments, the display may be in a separate window.

The user may select one of the indicated matches through the user interface (element 445). The user may, for example, click on a match and hit ENTER or TAB. A type-ahead apparatus may enter a remaining portion of text into the application based upon the matching (element 450). For example, if a match is to an initial portion of a segment of text, the apparatus may enter the remainder of the segment. The segment may be the segment selected by the user (element 455), or a modification of the segment, if exact matches are not required. In some embodiments, the user may then treat the text as other user-entered text. The user may perform direct in-line actions such as search, edit, copy or paste.

If the user enters additional text into an application which provides for auto-completion, elements 425 through 455 may be repeated (element 460). Otherwise, the method of flowchart 400 may end.

The method of flowchart 400 may enable a user to efficiently enter previously typed text into a text-entry window without undergoing the laborious copy-and-paste process described in the Background section. The user may recall the previously typed text by typing a few characters of the text, such as the first few words. The method may also enable a user to recall contact information for a person by typing a few characters from the person's name into the current application. In some embodiments, the laborious cut-and-paste process may be reduced to the following:

1. In a text-entry application such as IBM Lotus Sametime, Danny hits Ctrl-Space or Tab: "Are you on CC"
2. An embodiment of the text-entry module automatically completes the sentence to "Are you on CCT Dev?"
3. The embodiment may display the completion in a search field, and/or automatically fill in the explanation text for user to apply.
4. The embodiment may also display the following sentence, "It won't accept my connection because someone else is logged on." The user may apply it to his Sametime message.

In this example, Danny did not have to laboriously copy/paste from chat window to chat window. In addition, he did not have to worry about unsaved chats or whether the original chat windows stayed open. Similarly, if the text had originated in another application such as an email, Danny would have saved the additional steps of launching his email application and locating that email in his sent box before being able to copy and past the text into his IM client.

The elements of flowchart 400 are for illustration and not for limitation. In alternative embodiments, additional elements may be included, some of the elements of flowchart 400 may be omitted, or the elements may be performed in a different order. Some embodiments may omit some or all of elements 405 and 410, instead using fixed procedures that are not configurable by a user.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) of an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer of other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block of blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for text type-ahead. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of text entry, said method comprising:
   a processor of a computing device receiving text being entered into a text-entry application;
   said processor matching the received text to a plurality of indexed segments of text;
   after said matching, said processor displaying the plurality of indexed segments of text to a user, each displayed indexed segment consisting of either remaining text or the remaining text preceded by a finite portion of the entered text, said finite portion not including the entire entered text;
   said processor receiving from the user a selection of one indexed segment of text of the displayed plurality of indexed segments of text; and
   said processor entering the remaining text into the text-entry application by completing the entered text in the text-entry application resulting in the entire entered text followed by the remaining text in the text-entry application.

2. The method of claim 1, said method further comprising:
   said processor selecting strings of text from multiple sources based on text selection rules;
   said processor indexing the selected strings of text, said indexed segments of text being the plurality of indexed segments of text.

3. The method of claim 2, wherein said selecting strings of text from multiple sources comprises:
   said processor selecting pieces of text from different sources;
   said processor receiving an identification of the multiple sources from a user, wherein the different sources consist of the multiple sources and other sources; and
   said processor eliminating the pieces of text from the other sources such that the strings of text from the multiple sources consist of the pieces of text that have not been eliminated.

4. The method of claim 2, wherein the method further comprises said processor setting a display parameter equal to a minimum number of characters of the text being entered before said displaying the plurality of indexed segments of text is performed, and wherein said displaying the plurality of indexed segments of text is performed only after the minimum number of characters has been entered.

5. The method of claim 2, wherein the method further comprises said processor setting a display parameter which governs an order in which to display the plurality of indexed segments of text, and wherein said displaying the plurality of indexed segments of text is performed in accordance with the display parameter.

6. The method of claim 2, wherein the text selection rules include a rule that sets a minimum number of permitted words in each selected string of text, wherein the minimum number of permitted words in each selected string of text is at least two words.

7. The method of claim 2, wherein the text selection rules include a rule that sets a minimum number of permitted characters in each word in each selected string of text, wherein the minimum number of permitted characters in each word in each selected string of text is at least two characters.

8. The method of claim 2, wherein the multiple sources comprise an application, and wherein the text selection rules include a rule that requires each selected string of text to include text that has been entered at least twice into the application.

9. The method of claim 2, wherein the text selection rules include a rule that limits the selected strings of text to text that originated on or after a specified cut-off date.

10. The method of claim 1, wherein each displayed indexed segment consists of the remaining text.

11. The method of claim 1, wherein each displayed indexed segment consists of the remaining text preceded by the finite portion of the entered text.

12. A computer program product comprising a computer readable physically tangible storage device having a computer readable program code stored therein, said program code configured to be executed by a processor of a computing system to implement a method of text entry, said method comprising:
    said processor receiving text being entered into a text-entry application;
    said processor matching the received text to a plurality of indexed segments of text;
    after said matching, said processor displaying the plurality of indexed segments of text to a user, each displayed indexed segment consisting of either remaining text or the remaining text preceded by a finite portion of the entered text, said finite portion not including the entire entered text;
    said processor receiving from the user a selection of one indexed segment of text of the displayed plurality of indexed segments of text; and
    said processor entering the remaining text into the text-entry application by completing the entered text in the text-entry application resulting in the entire entered text followed by the remaining text in the text-entry application.

13. The computer program product of claim 12, wherein each displayed indexed segment consists of the remaining text.

14. The computer program product of claim 12, wherein each displayed indexed segment consists of the remaining text preceded by the finite portion of the entered text.

15. A computing system comprising a processor, a memory coupled to the processor, and a computer readable physically tangible storage device coupled to the processor, said storage device containing program code configured to be executed by the processor via the memory to implement a method of text entry, said method comprising:
    said processor receiving text being entered into a text-entry application;
    said processor matching the received text to a plurality of indexed segments of text;
    after said matching, said processor displaying the plurality of indexed segments of text to a user, each displayed indexed segment consisting of either remaining text or the remaining text preceded by a finite portion of the entered text, said finite portion not including the entire entered text;

said processor receiving from the user a selection of one indexed segment of text of the displayed plurality of indexed segments of text; and said processor entering the remaining text into the text-entry application by completing the entered text in the text-entry application resulting in the entire entered text followed by the remaining text in the text-entry application.

16. The computing system of claim 15, wherein each displayed indexed segment consists of the remaining text.

17. The computing system of claim 15, wherein each displayed indexed segment consists of the remaining text preceded by the finite portion of the entered text.

* * * * *